US007751860B2

(12) United States Patent
Symons et al.

(10) Patent No.: US 7,751,860 B2
(45) Date of Patent: Jul. 6, 2010

(54) VARIABLE CONFIGURATION APPARATUS

(76) Inventors: Peter Symons, c/o Innovision Research & Technology plc, 33 Sheep Street, Cirencester, Gloucestershire, GL7 1RQ (GB); Timothy Ward, c/o Innovision Research & Technology plc, 33 Sheep Street, Cirencester, Gloucestershire, GL7 1RQ (GB); Ian Keen, c/o Innovision Research & Technology plc, 33 Sheep Street, Cirencester, Gloucestershire, GL7 1RQ (GB); Kevin Lamacraft, c/o Innovision Research & Technology plc, 33 Sheep Street, Cirencester, Gloucestershire, GL7 1RQ (GB); Richard Underwood, c/o Innovision Research & Technology plc, 33 Sheep Street, Cirencester, Gloucestershire, GL7 1RQ (GB)

( * ) Notice: Subject to any disclaimer, the term of this patent is extended or adjusted under 35 U.S.C. 154(b) by 0 days.

(21) Appl. No.: 10/586,160
(22) PCT Filed: Jan. 14, 2005
(86) PCT No.: PCT/GB2005/000122
§ 371 (c)(1),
(2), (4) Date: May 16, 2007
(87) PCT Pub. No.: WO2005/069585
PCT Pub. Date: Jul. 28, 2005

(65) Prior Publication Data
US 2008/0039009 A1    Feb. 14, 2008

(30) Foreign Application Priority Data

Jan. 14, 2004  (GB) ................................. 0400805.8
Feb. 5, 2004   (GB) ................................. 0402588.8
May 7, 2004    (GB) ................................. 0410242.2

(51) Int. Cl.
*H04M 1/00*     (2006.01)
(52) U.S. Cl. .................. 455/575.3; 455/90.1; 455/90.3

(58) Field of Classification Search ................ 455/41.1, 455/90.1, 575.1, 569.1, 575.3, 575.5, 90.3, 455/557, 566
See application file for complete search history.

(56) References Cited

U.S. PATENT DOCUMENTS
4,763,340 A    8/1988  Yoneda et al. ............... 375/377
(Continued)

FOREIGN PATENT DOCUMENTS
CN           1324012         11/2001
(Continued)

OTHER PUBLICATIONS
PCT International Preliminary Report on Patentability issued Jul. 17, 2006, in corresponding International Application No. PCT/GB2005/000122.
(Continued)

*Primary Examiner*—Lana N Le
*Assistant Examiner*—Ping Y Hsieh
(74) *Attorney, Agent, or Firm*—Woodcock Washburn LLP

(57) ABSTRACT

A variable configuration apparatus has components or subsystems. At least some components (200 and 201) have mechanical coupling elements (101 and 102 and 103) that enable the configuration of the apparatus to be varied by changing at least one of the relative orientation and position of those components or subsystems. These mechanical coupling elements (101 and 102 and 103) incorporate wireless signal coupling elements (205 and 206) that cooperate to provide a wireless coupling which enables wireless coupling between the components. The wireless coupling may be used to transfer at least one of data and power between the components. The wireless signal coupling elements may be capacitive coupling elements that provide capacitive coupling between the components or sub-systems. In an example, the apparatus is a video camera and one component or sub-system is a display screen (201) and another component or sub-system is the main body (200) of the video camera (200).

18 Claims, 11 Drawing Sheets

U.S. PATENT DOCUMENTS

| | | | | |
|---|---|---|---|---|
| 5,170,173 | A | 12/1992 | Krenz et al. | 343/702 |
| 5,455,466 | A | 10/1995 | Parks et al. | 307/104 |
| 5,508,709 | A * | 4/1996 | Krenz et al. | 343/702 |
| 5,577,026 | A | 11/1996 | Gordon et al. | 370/278 |
| 5,949,565 | A | 9/1999 | Ishida | 398/131 |
| 6,272,324 | B1 | 8/2001 | Rudisill et al. | 455/575.8 |
| 6,321,067 | B1 * | 11/2001 | Suga et al. | 455/41.2 |
| 6,470,132 | B1 | 10/2002 | Nousiainen et al. | 385/146 |
| 6,719,206 | B1 | 4/2004 | Bashan et al. | 235/492 |
| 6,721,540 | B1 | 4/2004 | Hayakawa | 455/41.1 |
| 6,792,246 | B2 * | 9/2004 | Takeda et al. | 455/41.1 |
| 7,162,209 | B2 * | 1/2007 | Ono | 455/90.3 |
| 2003/0233288 | A1 | 12/2003 | Sweeney et al. | 705/28 |
| 2004/0204199 | A1 * | 10/2004 | Zax et al. | 455/575.1 |

FOREIGN PATENT DOCUMENTS

| | | |
|---|---|---|
| DE | 19542214 | 3/1997 |
| DE | 19940374 | 3/2001 |
| EP | 0 676 710 | 11/1995 |
| EP | 0 744 750 | 11/1996 |
| EP | 1 148 406 | 10/2001 |
| EP | 1 131 898 | 12/2001 |
| GB | 2 310 765 | 3/1997 |
| JP | 64-005235 | 1/1989 |
| JP | 6-508019 | 9/1994 |
| JP | 09-026834 | 1/1997 |
| JP | 10-213411 | 8/1998 |
| JP | 2001-033136 | 2/2001 |
| JP | 2001-68868 | 3/2001 |
| JP | 2001-101353 | 4/2001 |
| JP | 2001-292085 | 10/2001 |
| JP | 2003-234809 | 8/2003 |
| WO | WO 96/18969 | 6/1996 |
| WO | WO 00/30267 | 5/2000 |
| WO | WO 00/31676 | 6/2000 |
| WO | WO 01/31573 | 5/2001 |
| WO | WO 02/52419 | 7/2002 |
| WO | WO 02/93881 | 11/2002 |
| WO | WO 2005/069585 | 7/2005 |

OTHER PUBLICATIONS

PCT International Search Report mailed May 19, 2005, in corresponding International Application No. PCT/GB2005/000122.

Patent Office of the People's Republic of China, Office Action issued May 9, 2008, in corresponding Application No. 200580008219.5, 21 pages.

Patent Office of the People's Republic of China, Office Action issued Aug. 21, 2009, in corresponding Application No. 200580008219.5, 21 pages.

Patent Office of the People's Republic of China, Decision on Rejection issued Jan. 8, 2010, in corresponding Application No. 200580008219.5, 21 pages.

Communication by the Examining Division dated Jan. 18, 2010, in corresponding EP application No. 05701890.5.

Official Notice of Rejection dated Jan. 26, 2010, in corresponding JP application No. 2006-548401.

* cited by examiner

VARIABLE CONFIGURATION APPARATUS

CROSS REFERENCE TO RELATED APPLICATIONS

The present application is a national phase filing of Patent Cooperation Treaty application PCT/GB2005/000122 filed on Jan. 14, 2005, which claims priority to Great Britain application 0400805.8 filed on Jan. 14, 2004, Great Britain application 0402588.8 filed on Feb. 5, 2004, and Great Britain application 0410242.2 filed on May 7, 2004, the contents of all of which are hereby incorporated by reference.

This invention relates to a variable configuration apparatus in which components or sub-systems of the apparatus are mechanically coupled to enable the configuration of the apparatus to be varied by changing at least one of the relative orientation and position of the components or sub-systems.

This invention relates in particular to a variable configuration apparatus in which at least one of data and power is desired to be communicated between the components or sub-systems. For example, one of the components or sub-systems may be a user interface such as a display while the other may be a main body or other functional component of the apparatus. Examples of such apparatus are video cameras, laptop computers and personal data assistants (PDAs), video display units, screen based GPS systems and electronic test equipment, and other screen based systems or units or other apparatus with similar assemblies or mechanisms. The mechanical coupling may be, for example, a rotational hinge assembly or a sliding mechanism.

Such apparatus use a multi-wire cable connection (for example a flat ribbon cable) coupled between the relatively movable components by multi-pin connectors provided at each end of the cable to convey signals such as data signals between the components or sub-systems. However, each time the configuration of the apparatus is changed relative movement is necessary between the mechanically coupled components. Over time, the stresses and strains this repeated movement places on the multi-wire connection can result in stress failure of the moveable elements and/or the connection interfaces that are used to attach the multi-pin connectors at each end of the cable connection.

In one aspect, the present invention provides apparatus having mechanically coupled components or sub-systems wherein the mechanical coupling is associated with a wireless signal coupling that enables wireless coupling of a signal between the components or sub-systems.

In one aspect, the present invention provides apparatus comprising a plurality of components or sub-systems having respective mechanical coupling elements that mechanical couple to enable the configuration of the apparatus to be varied by changing at least one of the relative orientation and position of the components or sub-systems, and wherein each of the first and second mechanical coupling elements provides a respective signal coupling means and the signal coupling means cooperate to enable wireless coupling of a signal from one of the components or sub-systems to the other or to another one of the components or sub-systems of the apparatus.

In an embodiment, the present invention provides a portable device comprising first and second components having respective first and second mechanical coupling elements that cooperate to mechanically couple the first and second components so as to allow movement of at least one of the first and second components relative to the other, wherein each of the first and second mechanical coupling elements provides a respective signal coupling means and the signal coupling means cooperate to enable wireless coupling of a signal from one of the first and second components to the other of the first and second components.

In an embodiment, each signal coupling means comprises at least two signal coupling elements. Each signal coupling element is associated with a mechanical coupling element forming a signal coupler. The signal coupling means may be incorporated in the mechanical coupling. For example, the signal coupling means may be carried by or form part of the corresponding mechanical coupling element.

In an embodiment, at least one component or sub-system has data providing means for communicating data to the other component or sub-system or to another one of the components or sub-systems within the apparatus via the wireless coupling provided by the signal coupling means.

In an embodiment, at least one component or sub-system of the apparatus has signal supplying means coupled to the signal coupling means for supplying a signal to be coupled to the other component or sub-system or to another one of the components or sub-systems within the apparatus via the wireless coupling and at least one component or sub-system is arranged to communicate data to the other component or sub-system or to another one of the components or sub-systems within the apparatus by modulating that signal.

In an embodiment, at least one component or sub-system has power deriving means for deriving a power supply for that component or sub-system from a signal coupled to that component or sub-system from the other or another component or sub-system within the apparatus via the wireless coupling. The power deriving means may comprise rectifying means or rectifying means and charge storage means.

Generally, the signal coupling means comprise electrical signal coupling means providing capacitive or inductive wireless coupling.

The degree of coupling between the signal coupling means may vary with the relative positions and/or orientations of the components or sub-systems and determining means may be provided for determining the degree of coupling. For example, the determining means may be provided to determine information relating to the relative positions and/or orientations of the components or sub-systems within the apparatus.

The mechanical coupling elements may comprise at least one of a rotatable and a slidable mechanical coupling.

The mechanical coupling elements may provide coaxial parts of a hinge. As another possibility, the mechanical coupling elements may define a ball and socket arrangement. As a further possibility, the mechanical coupling elements may provide a sliding mechanical coupling allowing one component or sub-system to slide relative to the other or another component or sub-system within the apparatus.

Although, generally, the components or sub-systems within an apparatus of the present invention remain relatively movable, in some circumstances, the relative positions and/orientations of components or sub-systems may be fixed once the mechanical coupling is made The components may be sub-systems or sub-assemblies. As an example, one component may be a user interface device such as a display device, or a user input device such as a keyboard or an access control device such as a locking mechanism.

The variable configuration apparatus may be a portable device. For example, the apparatus may be, for example a laptop, PDA, video display unit, video camera, or a GPS system or electronic test equipment, other screen based systems or units or other apparatus with similar assemblies or mechanisms The present invention also provides a method of wirelessly coupling a signal from a first component to a second component that is mechanically coupled to the first component to allow movement of at least one of the first and second components relative to the other, the method comprising wirelessly coupling the signal from the first component to the second component via the mechanical coupling of the first and second components.

Apparatus embodying the invention allows, by virtue of the wireless coupling, a greater level of stress isolation to exist between the relatively movable components or sub-systems, which should reduce stress based failures.

An embodiment of the invention allows increased flexibility so that different components or sub-systems can be utilised without any requirement to replace the mechanical or galvanic connectors that are otherwise typical in such systems. For example where the apparatus comprises a video camera and the mechanically coupled components comprise the camera main body and a display screen, the screen may be replaced with a different screen or different functional unit and the same wireless data and power transfer used between the main body of the camera system and the new screen or functional unit.

It should be noted that the use of wireless coupling per se has previously been proposed. Thus, for example, WO 00/31676 describes capacitive coupling of a games piece to a game board to enable data to be transferred between a playing piece and a microprocessor. WO 02/093881 uses a form of wireless coupling to transfer data between a system and a separate attachable component or fascia. U.S. Pat. No. 5,455,466 describes a system in which a portable device is recharged via an inductive link that is also used for data transfer to a second electronic device. DE19542214 describes a communications system comprising a central communications unit and at least one cable-less peripheral communications unit which communicates wirelessly through the use of electromagnetic coupling with power being transferred to the peripheral communication device through the use of magnetic coils of a band pass filter. JP2001033136 describes a refrigerator in which electromagnetic induction coupling enables information to be communicated between the refrigerator main body and door. WO 00/30267 describes a cellular phone with a flip cover connected to the main body of the phone through a hinge assembly and describes transfer of radio signals between a first antenna on the main body and a second antenna on the flip cover by capacitive coupling. DE 19940374 describes a data transmission method in which a transponder is activated and its data updated by a high frequency (HF) field provided by a mobile data detection device.

Embodiments of the invention will now be described, by way of example, with reference to the accompanying drawings, in which.

Figure 1:
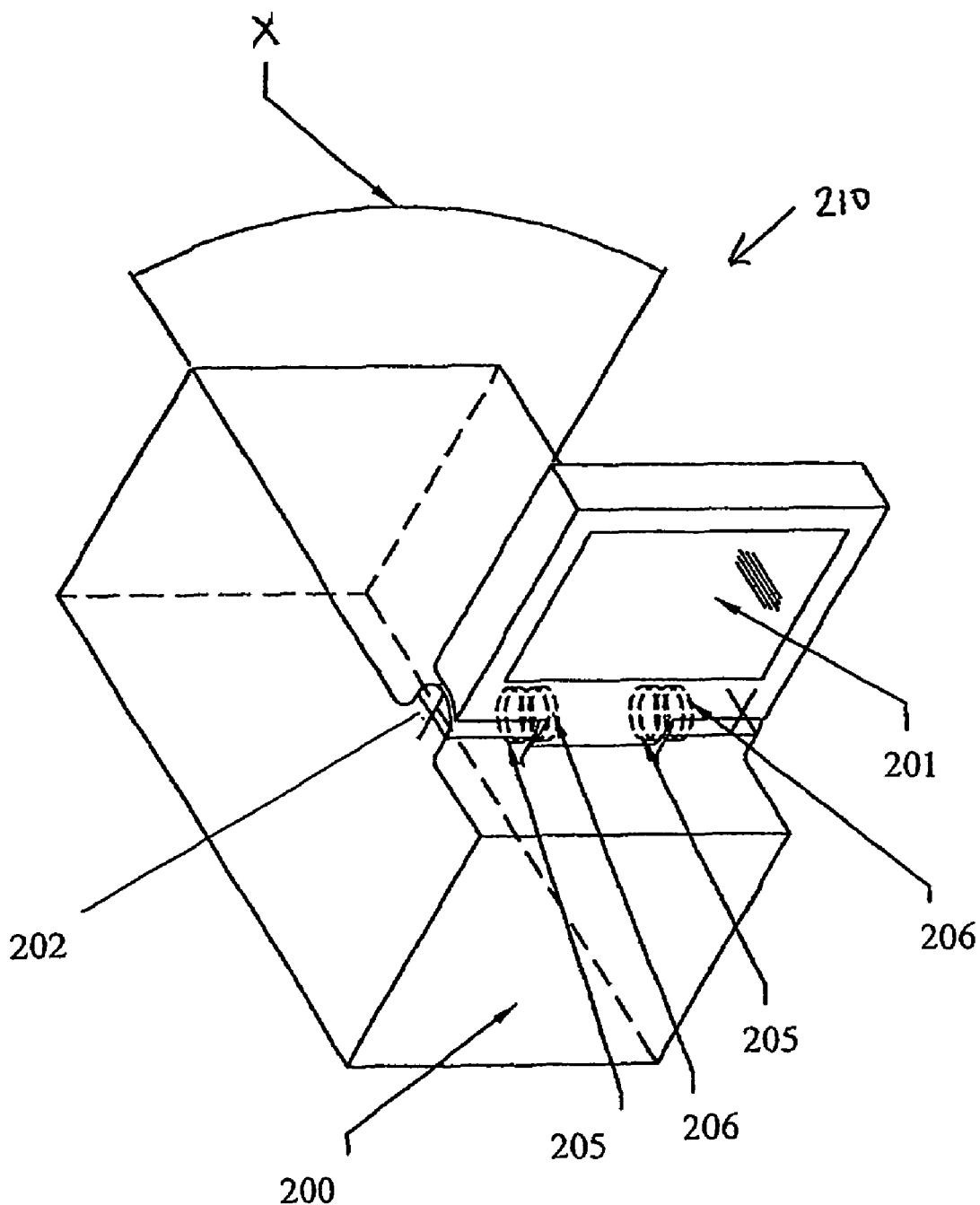
FIG. 1 shows a simplified perspective view of a first embodiment of apparatus in accordance with the invention in the form of a video camera wherein a first form of capacitive wireless coupling is incorporated in a rotatable mechanical coupling between a display screen and a main body of the video camera.
Figure 2:
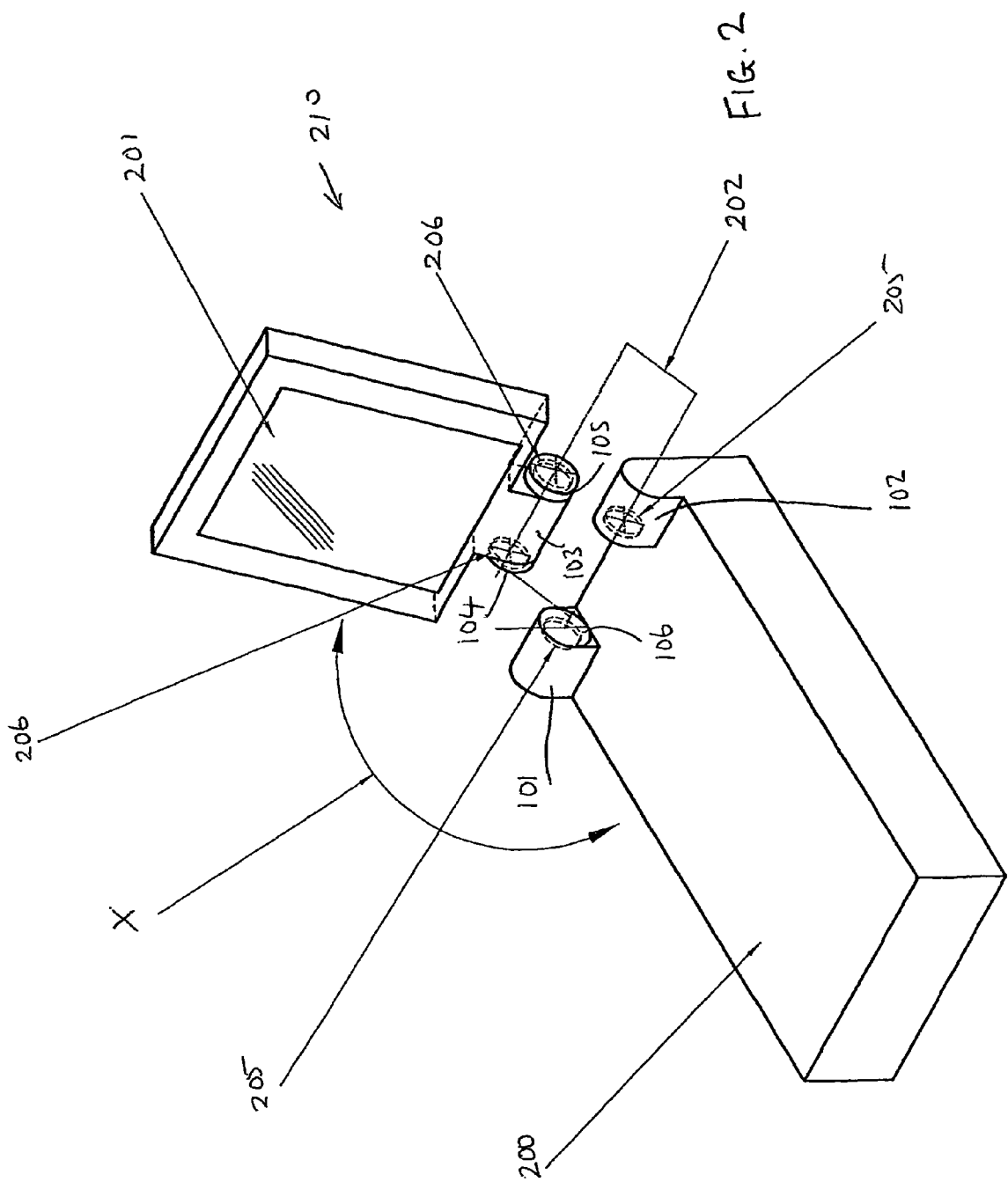
FIG. 2 shows an exploded simplified perspective view of the video camera shown in FIG. 1 to illustrate in greater detail the mechanical coupling and the capacitive wireless coupling between the display screen and the main body of the video camera.

Referring now to the drawings, FIGS. 1 and 2 illustrate a video camera 210 embodying the invention in which a mechanical coupling 202 is provided between a main body 200 and a rotatable display screen 201 of the video camera 210 with the arc X in FIG. 1 illustrating the angle through which the display screen may be rotated relative to the main body of the video camera. Capacitive wireless coupling 205 and 206 is incorporated in the mechanical coupling 202 by means of which the display screen 201 derives a power supply and by means of which data is communicated between the main body 200 and the display screen 201.

For simplicity the majority of the conventional components of the camera, such as the lens and operating switches etc., are omitted from FIGS. 1 and 2.

As shown in FIGS. 1 and 2, the mechanical coupling between the main body and the display screen is in the form of a hinge assembly 202 as is conventional for such video cameras. However, in accordance with the invention the multi-wire cable connection (generally a flat ribbon cable) normally provided within the hinge assembly to electrically connect the main body and the display screen is replaced by capacitive wireless coupling.

As can be seen most clearly in FIG. 2, in this example the hinge assembly comprises first and second aligned but spaced-apart hinge members 101 and 102 carried by the main body 200 and a third elongate hinge member 103 carried by the display screen 201. Alternatively the third elongate hinge member 103 may be carried by the man body 200 and the hinge members 101 and 102 by the display screen 201.

The ends of the third hinge member have chamfered projecting regions 104 and 105 which are received in respective complementarily chamfered recesses (only one 106 of which can be seen in FIG. 2) of the first and second hinge members 101 and 102 so that the third hinge member 103 can rotate about its axis relative to the first and second hinge members. The axis of the third hinge member thus defines the axis of rotation of the display screen 201 relative to the main body 200 of the video camera. In this example, the capacitive wireless coupling comprises two capacitive couplers each consisting of two capacitive coupling elements separated by a dielectric. Each capacitive coupling element is a circular electrically conductive plate 205 or 206. The capacitive coupling elements 205 are fitted into the recesses 106 of the first and second hinge members and the capacitive coupling elements 206 are carried by the projecting regions 104 of the third hinge member 103 to define two sets of parallel spaced-apart electrically conductive plates that are coaxial with the rotation axis of the hinge. The dielectric may simply be air or could be any suitable material providing the required dielectric and friction properties, for example a plastics material such as polyethylene or polytetrafluorethylene (PTFE) (which has the advantage of a very low coefficient of friction), or a ceramics material.

Although not shown in FIGS. 1 and 2, first electrical connections are made between electric circuitry within the main body 200 and the capacitive plates 205 fitted into the recesses 106 and second electrical connections are made between electric circuitry within the display screen and the capacitive plates 206 carried by the projecting regions 104 of the third hinge member 103 of the display screen 201. These electrical connections may be made by, for example, insulated wires passing through the hinge members.

The capacitive wireless coupling thus comprises two capacitive wireless couplers located within the hinge assembly and each comprising two parallel coaxial plates or discs 205 and 206. A minimum of two such capacitive wireless couplers is provided to ensure a flow and return current path. However multiple capacitive wireless couplers may also be used.

Figure 3:
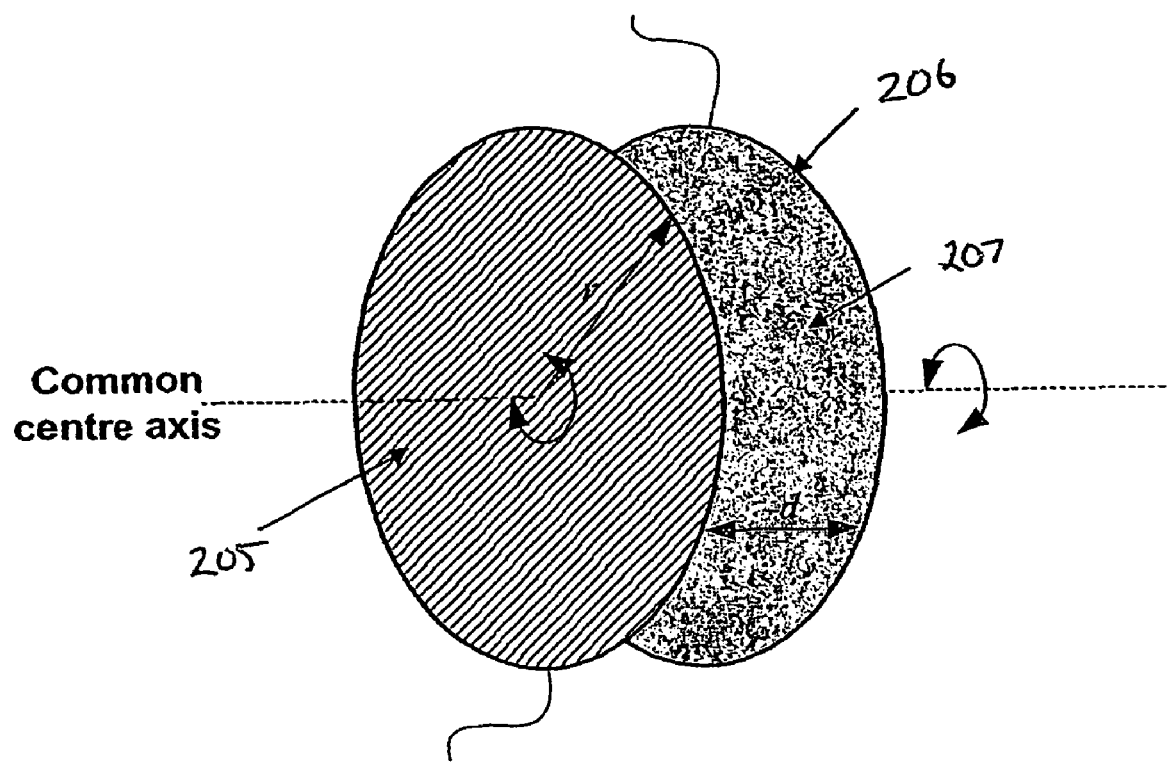
FIG. 3 shows a diagram for explaining the operation of the capacitive wireless coupling shown in FIGS. 1 and 2.

FIG. 3 shows a diagram representing one of the pairs of capacitive plates shown in FIG. 2 for explaining the operation of the capacitive wireless coupling. The capacitance between the plates 205 and 206 of a capacitive coupler is approximated (that is ignoring edge effects) by $$C = \frac{\varepsilon A}{d},$$

where $\varepsilon = \varepsilon_0 \varepsilon_r$, $\varepsilon_r$ is the relative permittivity (or dielectric constant) of the dielectric 207 material, $\varepsilon_0$ is the permittivity of free space (8.85×10$^{-12}$ F/m), A is the area of overlap of the plates 205 and 206 and d is the separation of the plates 205 and 206, that is the thickness of the dielectric 207. The capacitance may be controlled to meet the requirements of a particular apparatus by adjusting any one or more of $\varepsilon$, A and d. For example, in order to maximise the capacitance for a given mechanical configuration, $\varepsilon$ and A should be maximised and d minimised. Typically d is of the order of a few micrometers.

Figure 4:
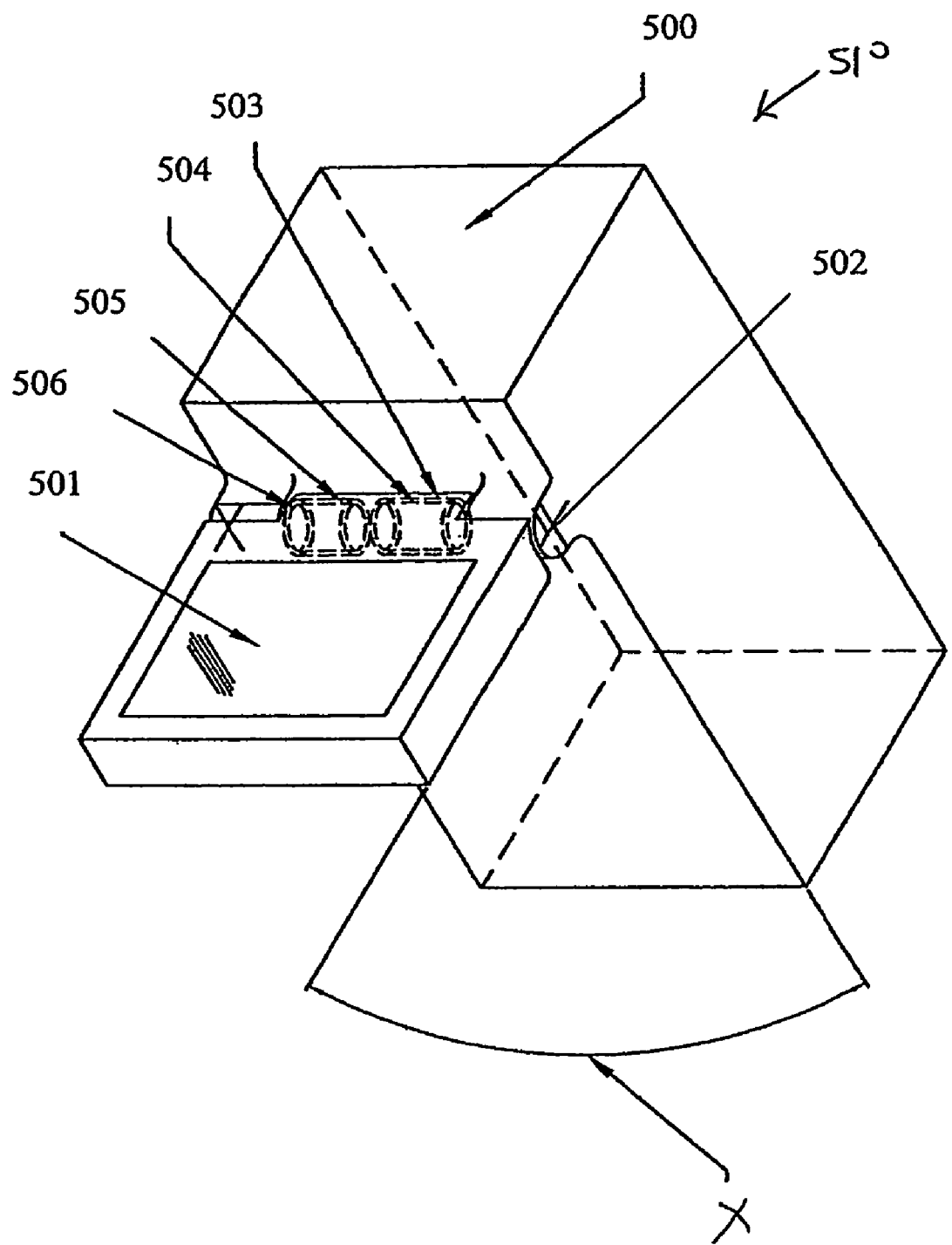
FIG. 4 shows a simplified perspective view of a second embodiment of apparatus in accordance with the invention in the form of a video camera wherein a second form of capacitive wireless coupling is incorporated in a rotatable mechanical coupling between a display screen and a main body of the video camera.
Figure 5:
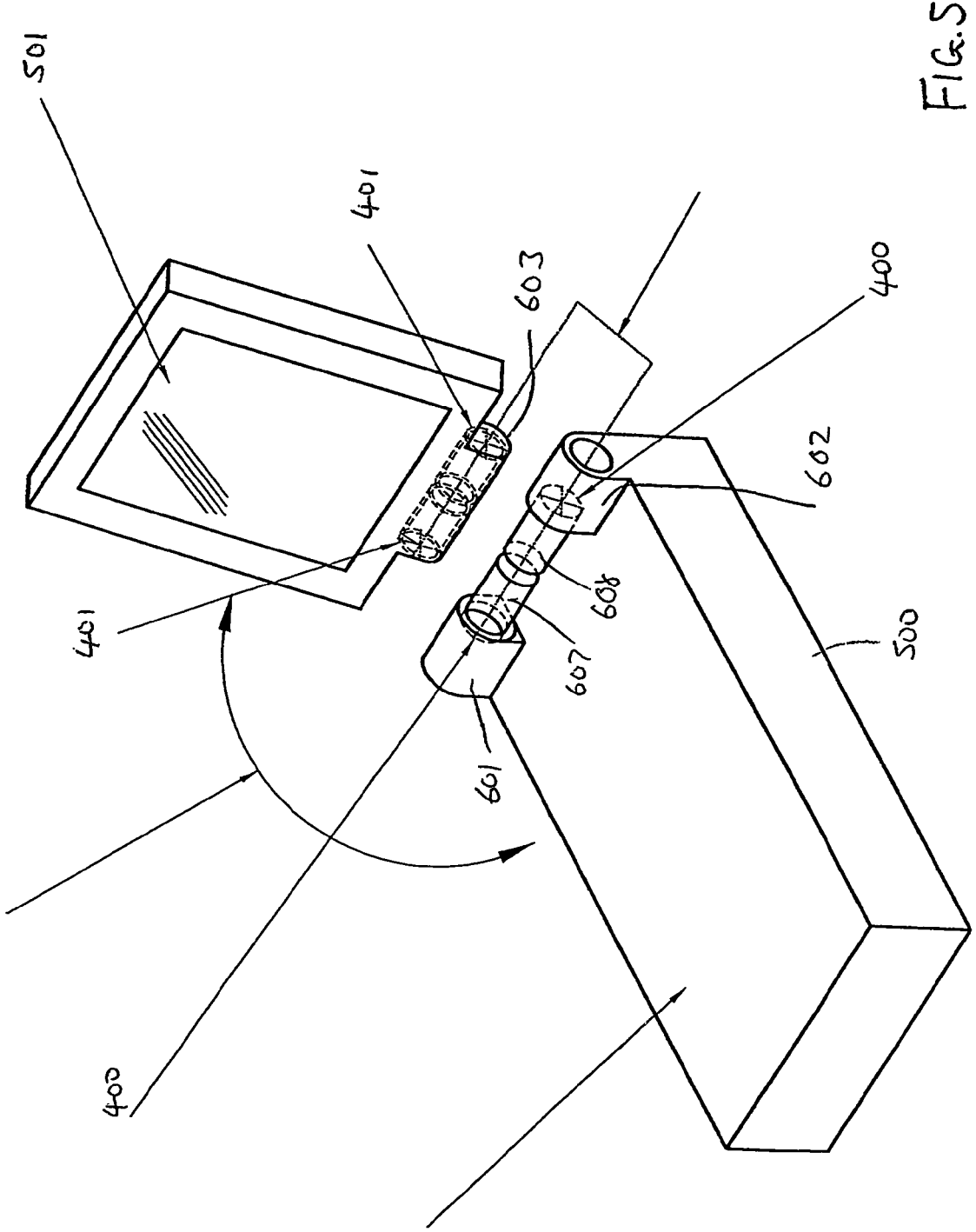
FIG. 5 shows an exploded simplified perspective view of the video camera shown in FIG. 4 to illustrate in greater detail the mechanical coupling and the capacitive wireless coupling between the display screen and the main body of the video camera.

FIGS. 4 and 5 show simplified perspective views of another video camera 510 embodying the invention which differs from that described above in both the form of the mechanical coupling and the form of the wireless capacitive coupling.

Figure 7:
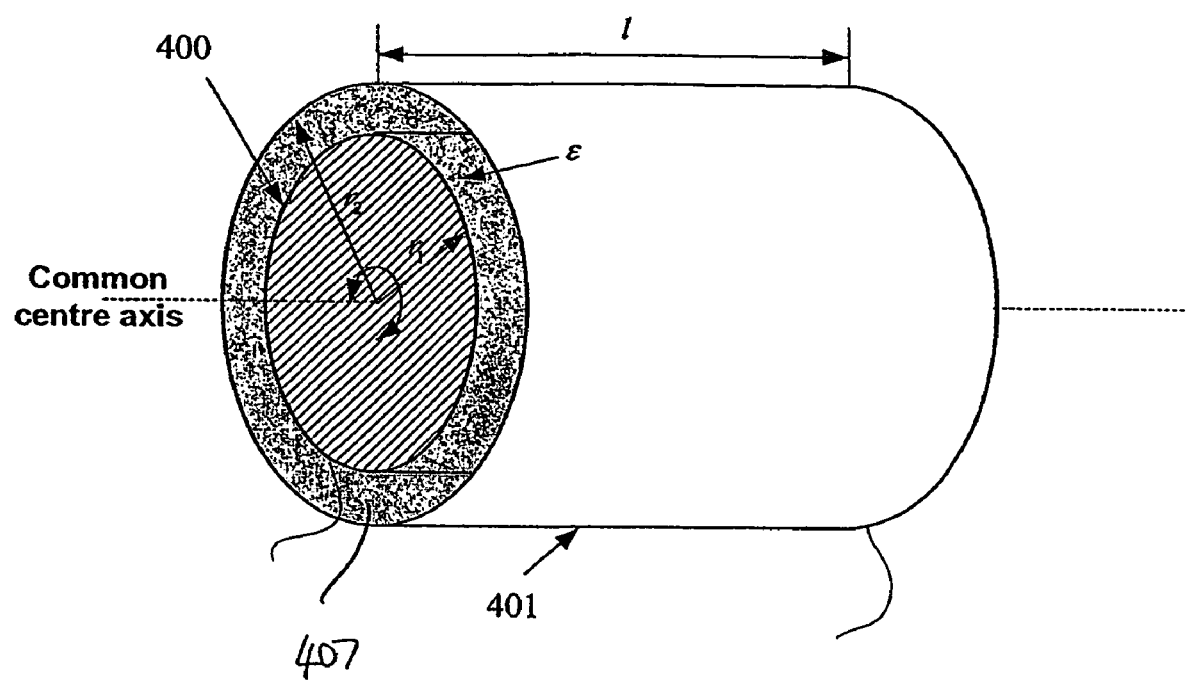
FIG. 7 shows a diagram for explaining the operation of the capacitive wireless coupling shown in FIGS. 4, 5 and 6.

FIG. 7 shows a cross-sectional view through part of the apparatus to show how the capacitive coupling is incorporated into the mechanical coupling.

Figure 6:
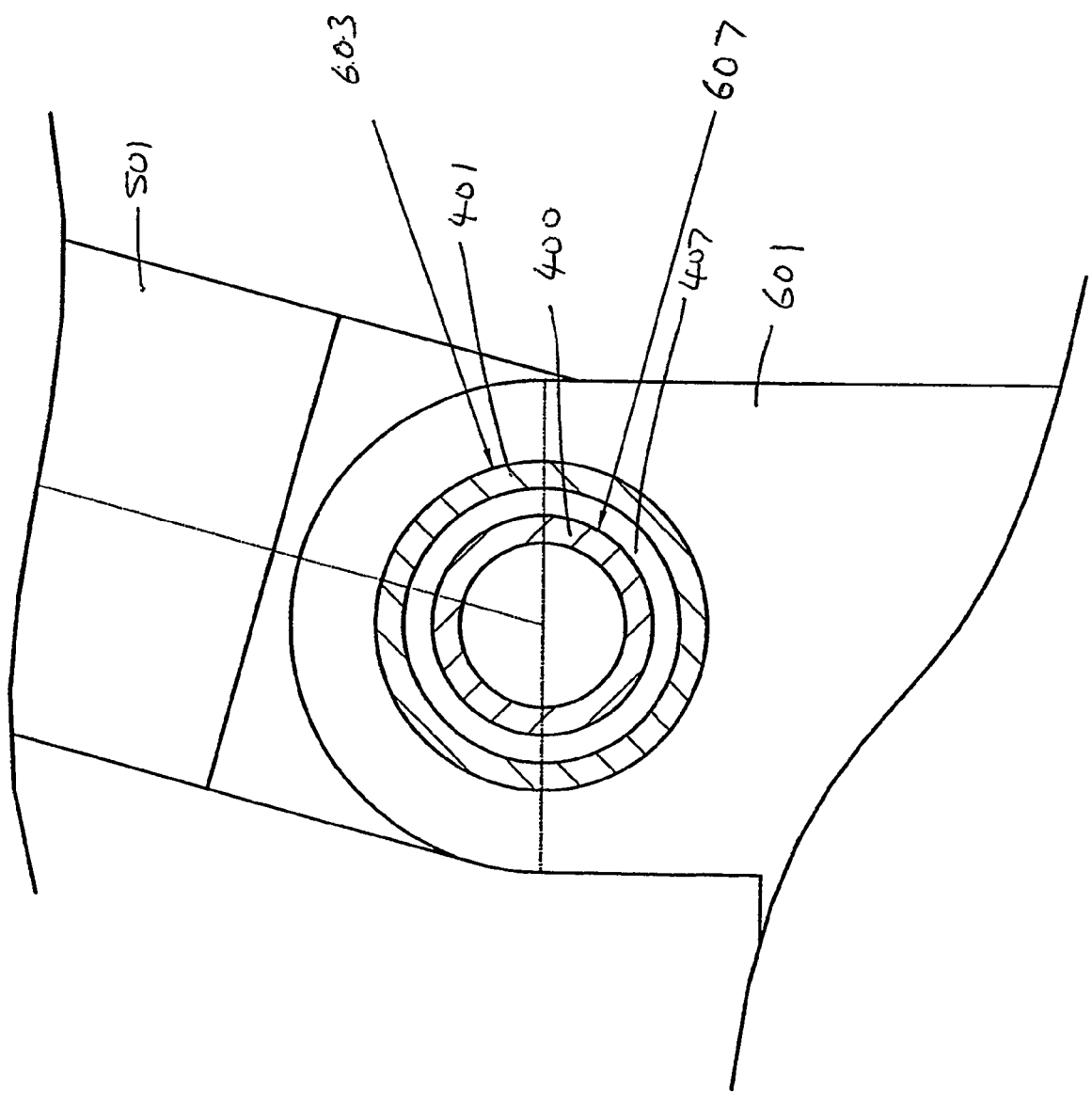
FIG. 6 shows a cross-section taken through part of the mechanical coupling shown in FIG. 5 to illustrate the incorporation of the capacitive wireless coupling in the mechanical coupling.

As shown most clearly by the exploded perspective view of FIG. 5 and the cross-section shown in FIG. 6 and taken through part of the mechanical coupling, in this case the mechanical coupling comprises a hinge assembly having first and second aligned but spaced-apart hinge members 601 and 602 carried by the main body 500, and a third elongate hinge member 603 carried the display screen 501. Alternatively, the third elongate hinge member 603 may be carried by the main body 500 and the hinge members 601 and 602 by the display screen 501.

The third elongate hinge member 603 is in the form of a hollow cylinder and the first and second spaced-apart hinge members 601 and 602 carry cylindrical projections 607 and 608 that are received within respective ends of the hollow cylinder 603 so that the third hinge member can rotate about its axis relative to the first and second hinge members. The axis of the third hinge member thus defines the axis of rotation of the display screen 501 relative to the main body 500 of the video camera 510.

In this example the wireless capacitive coupling is again provided by two capacitive couplers each having two capacitive coupling elements separated by a dielectric. However, as shown by FIGS. 5 and 6, in this case each capacitive coupling element is in the form of an electrically conductive cylinder so that each capacitive coupler consists of two coaxial cylinders separated by a dielectric. One cylinder 400 of each capacitive coupler is carried by a respective one of the projections 607 and 608 and the other cylinder 401 of each capacitive coupler is carried by the inner surface of the hollow cylindrical third hinge member 603 so that the two cylinders 400 and 401 of each capacitive coupler are coaxial and are separated by a dielectric 407 (FIG. 6) which again may simply be air or could be any suitable material providing the required dielectric and friction properties, for example a plastics material such as polyethylene or polytetrafluorethylene ((PTFE) which has the advantage of a very low coefficient of friction), or a ceramics material.

The cylinders 400 and 401 may be provided as for example electrically conductive coatings deposited onto the projections 607 and 608 and the interior of the hollow cylinder 603 or as separate electrically conductive cylinders mounted on the projections 607 and 608 and within the hollow cylinder 603.

Although not shown in FIGS. 4 to 6, first electrical connections are made between electric circuitry within the main body 500 and the capacitive cylinders 400 carried by the projections 607 and 608 and second electrical connections are made between electric circuitry within the display screen and the capacitive cylinders 401 carried within the third elongate hinge member 603 of the display screen 501. These electrical connections may be made by for example insulated wires passing through the hinge members.

This capacitive wireless coupling thus comprises two capacitive wireless couplers located within the hinge assembly and each comprising two parallel coaxial cylinders 400 and 401. Again, although two such capacitive wireless couplers are shown to ensure a flow and return current path, multiple capacitive wireless couplers may also be used.

FIG. 7 shows a diagram for explaining the operation of the capacitive wireless coupler shown in FIGS. 4 to 6. In this example, the capacitance C of a coupler is given by $$C = \frac{2\pi \varepsilon l}{\ln\left(\frac{r_2}{r_1}\right)}.$$

where $r_1$ and $r_2$ are, as shown in FIG. 7, the radii of the two cylinders 400 and 401, l is the overlap length of the cylinders and $\varepsilon$ is again $\varepsilon = \varepsilon_0 \varepsilon_r$, $\varepsilon_r$ is the relative permittivity (or dielectric constant) of the dielectric 407, and $\varepsilon_0$ is the permittivity of free space ($8.85 \times 10^{-2}$ F/m), The capacitance of such a capacitive coupler may be controlled to meet the requirements for a particular application by adjusting any one or more of $r_2$, $r_1$, l and $\varepsilon$. Thus, to maximise the capacitance:

the dielectric gap $r_2 - r_1$ should be made as small as possible, typically of the order of a few micrometers, since the capacitance is inversely proportional to this parameter;

the overlap length l of the coaxial cylindrical elements should be as long as possible since this directly controls the area of the equivalent capacitive plates;

the absolute value of $r_2$, for a given dielectric gap, should be as large as possible because this directly controls the area of the equivalent capacitive plates; and the permittivity (or dielectric constant) of the dielectric 407 should be as large as possible.

In the above examples, the mechanical couplings enable rotation about a single axis and the capacitive coupling elements have circular or cylindrical symmetry. The present invention may also be applied where the mechanical coupling enables rotation about more than one axis or enables displacement of one component of an apparatus relative to another.

Figure 8:
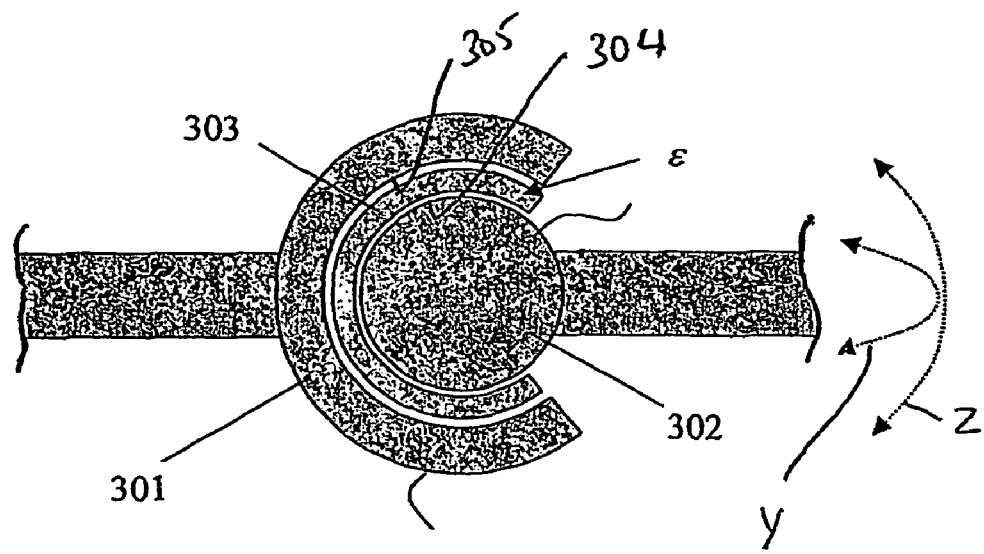
FIG. 8 shows a cross-sectional view through part of another apparatus embodying the invention having a capacitive wireless coupling incorporated in a ball and socket mechanical coupling.

FIG. 8 shows a cross-section through part of another apparatus embodying the invention in the region of the mechanical coupling. In this example, the mechanical coupling is in the form of a three dimensional ball-joint rotatable into and out of the plane of the paper in arc Y and rotatable in the plane of the paper in arc Z. The capacitive coupling is provided so that the outer surface 304 of the ball 302 forms one capacitive coupling element and the inner surface 305 of the socket 301 forms the other capacitive coupling element with the two being separated by a dielectric 303 which may be air or one of the materials mentioned above. In this example, the ball and socket themselves may be electrically conductive or they may have electrically conductive coatings to provide the capacitive coupling elements. As mentioned above, to ensure the presence of a flow and return path, the capacitive coupling should comprise at least two capacitive couplers. Where the apparatus requires two such ball and socket joints, this may be achieved by forming both of the ball and socket joints as capacitive couplers of the form shown in FIG. 8.

Figure 9:
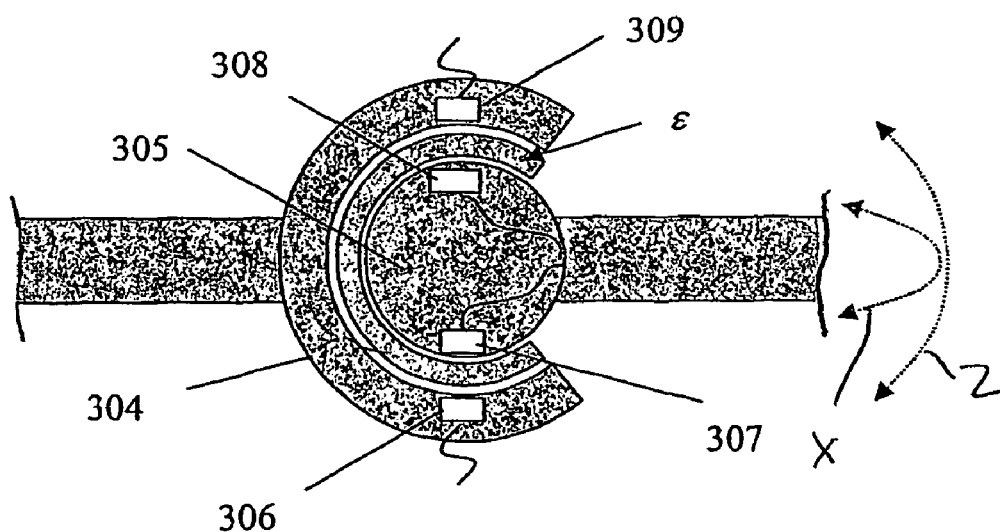
FIG. 9 shows a cross-sectional view similar to FIG. 8 but having a modified form of capacitive wireless coupling incorporated in the ball and socket mechanical coupling.

FIG. 9 shows a modified form of the ball and socket coupling shown in FIG. 8 in which at least two separate capacitive coupling elements 307 and 308 are provided on the ball and corresponding capacitive coupling element 306 and 309 are provided on the socket to provide at least two capacitive couplers 306 and 307 and 308 and 309. Although these capacitive coupling elements are shown as being relatively small it will be appreciated that they should be made as large as is possible without causing cross-talk to provide sufficient overlap between the respective capacitive coupling elements of a capacitive coupler throughout the required range of movement of the ball joint over which the wireless coupling is to be effective. In this example, the capacitive coupling elements may be provided by electrically conductive regions deposited onto or applied to the ball and socket, or such regions may be made part of the ball and socket on manufacture.

Again although not shown in FIGS. 8 and 9, electrical connection will be made within the main body and display screen respectively to the capacitive coupling elements by for example insulated wires passing through the ball and socket.

Figure 10:
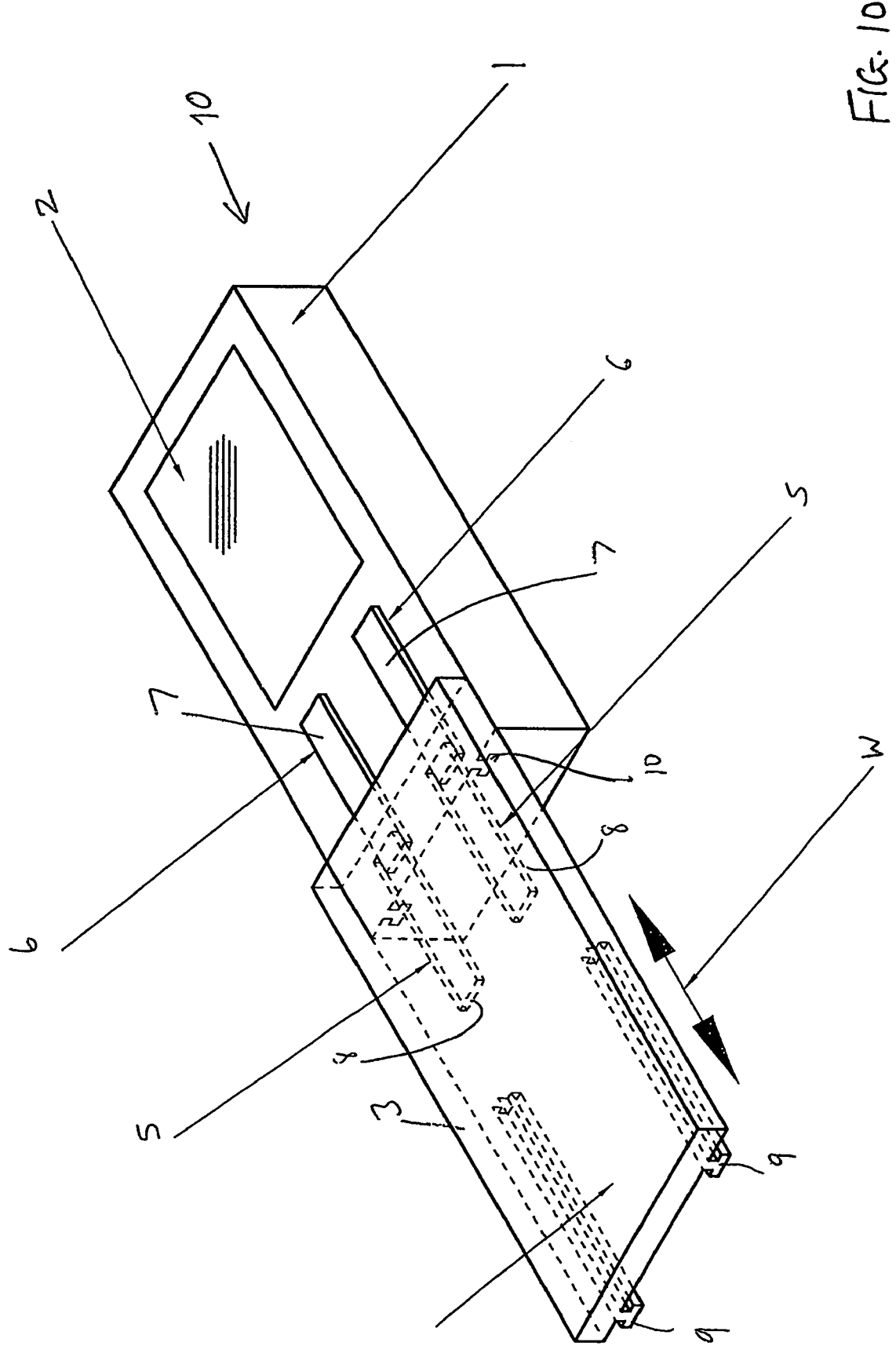
FIG. 10 shows a simplified perspective view of another embodiment of apparatus in accordance with the invention in the form of a portable electronic device having a capacitive wireless coupling forming part of a slidable mechanical coupling between a main body of the device and a cover of the device.

FIG. 10 shows a simplified perspective view of another embodiment of apparatus in accordance with the invention in the form of a portable electronic device 10 such as a portable digital assistant (PDA) having a main body 1 with a display screen 2 and a protective cover 3 that is slidable in the direction W. The protective cover 3 incorporates circuitry, for example a passive data storage device or possibly a small digital camera. In this case, the capacitive wireless coupling is provided by part of the slidable mechanical coupling.

As can be seen from FIG. 10, the slidable mechanical coupling is provided in part by inverted T cross-section guide rails 9 on the underside of the cover arranged to be received in correspondingly shaped guide grooves 10 on the main body 1 when the cover is in a closed condition covering the display screen 2 and in part by elongate recesses 5 provided on the underside of the cover 3 and complementary elongate projections 6 carried by the main body. Each of the elongate recesses 5 and complementary elongate projections 6 provides or carries an elongate capacitive coupling element 7 and 8 extending in the direction in which the cover is slidable. The dielectric is in this case provided by a small air gap between the cover and the main body. The lengths and relative positions of the elongate capacitive coupling elements 7 and 8 in the direction of sliding are selected so as to provide sufficient capacitive coupling to enable power and data to be communicated between the main body 1 and the slidable cover 3 over the desired range of movement of the cover 3 within which wireless communication is to be effective. This range may depend upon whether the electrical circuitry carried by the cover 3 is designed to be active when the cover is closed or when the cover is open sufficiently to expose the whole of the display, for example. Again electric connections extend through the main body to the elongate capacitive coupling elements 7 and through the cover to the elongate capacitive coupling elements 8. Also, again although two capacitive couplers are provided to provide a flow and a return path, additional capacitive couplers may also be provided.

Figure 11:
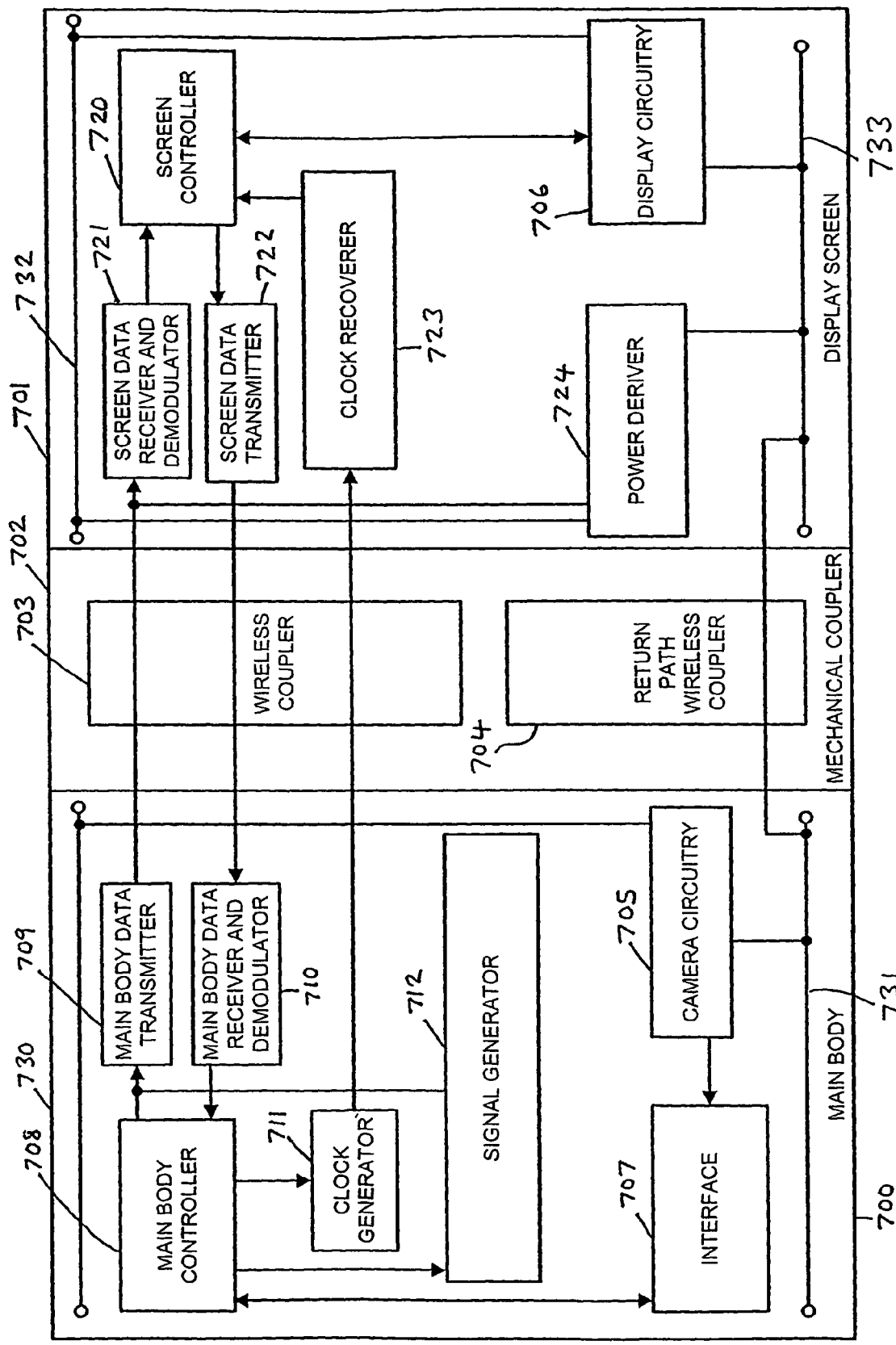
FIG. 11 shows a functional block diagram of apparatus embodying the invention for illustrating communication via the wireless coupling.

FIG. 11 shows a simplified functional block diagram of apparatus embodying the invention for illustrating communication via the wireless coupling associated with the mechanical coupling.

Blocks 700 and 701 in FIG. 11 represent the two components of the apparatus that are coupled together by the mechanical coupling, itself represented by block 702. In this example the apparatus is a video camera with a movable screen as described above with reference to FIGS. 1 to 3 or FIGS. 4 to 7 and block 700 represents the functional components of the main body of the video camera while block 701 represents the functional components of the display screen. For simplicity, the wireless coupling is show simply as two blocks 703 and 704, with block 704 representing the return wireless coupler.

The functional components of the main body include camera circuitry 705 having all of the normal components of the camera such as the power supply, processor control circuitry for controlling the camera lens assembly and overall operation of the camera and data processing circuitry for generating data in a form suitable for transmission via the mechanical coupling to the display screen. Similarly, the functional components of the display screen include display circuitry 706 having the usual driving circuitry for controlling driving of the display of the display screen, for example an LCD (Liquid Crystal Display) driver interface, LCD driver and a data store where the display is an LCD device. As these functional components 705 and 706 are conventional they will not be described.

The camera main body 700 also includes power and data supply control circuitry that controls communication of power and data between the main body and the display screen via the wireless couplers 703 and 704. The power and data supply control circuitry includes an interface 707 that enables the power and data supply control circuitry to communicate with the camera circuitry 705. In this example, the power and data supply control circuitry is powered by the camera power supply. This is represented in FIG. 11 by coupling the camera circuitry 705 to power supply lines 730 and 731. In the interests of simplicity the connections of the other functional components of the main body to the power supply lines 730 and 731 are not shown in FIG. 11. It will of course be appreciated that the power and data supply control circuitry may alternatively be self-powered, for example by means of a battery.

The main body power and data supply control circuitry has a main body controller 708 that communicates with a processor of the camera circuitry 705 via the interface 707 and that controls the operations necessary to enable communication of data between the display screen and the main body via the wireless coupling. In this example, the display screen is not self-powered so the controller 710 also controls the supply to the display screen of a signal from which the display screen derives a power supply as will be described below.

The main body power and data supply control circuitry includes a signal generator 712 for generating an alternating (AC) signal which is supplied to the main body capacitive coupling element of the wireless coupler 703 and a main body data transmitter 709 for supplying data to the display screen via the wireless coupling. The data transmitter 709 may, for example, transmit data under the control of the main body controller 708 by modulating the signal supplied by the signal generator 712 (or a separate carrier signal) in accordance with data supplied by the main body controller 708, generally under the control of the camera control circuitry 705 via the interface 707. Any appropriate modulation scheme such as amplitude, phase or frequency modulation may be used. Also, any suitable data coding scheme may be used, although generally a NRZ (non-return-to-zero) data code will be used. Where a separate carrier signal is used it may be, for example, a 13.56 MHz carrier signal, although different carrier signals may be used for different signal types or application requirements. The signal supplied by the signal generator 712 may be a continuous signal or a burst signal with, in the latter case, the capacitive coupling enabling communication between the main body and the display screen in bursts, depending upon the particular apparatus. The signal generator 712 may form part of the main body data transmitter 709.

The display screen 701 also includes power and data supply control circuitry. This includes a screen data receiver and demodulator 721 coupled to the display screen capacitive coupling element of the wireless coupler 703 for extracting the data transmitted by the main body data transmitter 709 from the signal capacitively coupled to the display screen via the wireless coupler 703 and a screen controller 720 for communicating with the display circuitry 706 to cause the display to act in accordance with the data extracted from the signal coupled to the display screen via the wireless coupler.

In this example, as the display screen is not self-powered, a DC power supply for the display screen is derived by a power deriver 724 coupled between the power supply lines 732 and 733 from a signal capacitively coupled to the display screen via the wireless coupling. In the interests of simplicity the connections of the other functional components of the display screen (other than the display circuitry 706) to the power supply lines 732 and 733 are not shown in FIG. 11.

Figure 12:
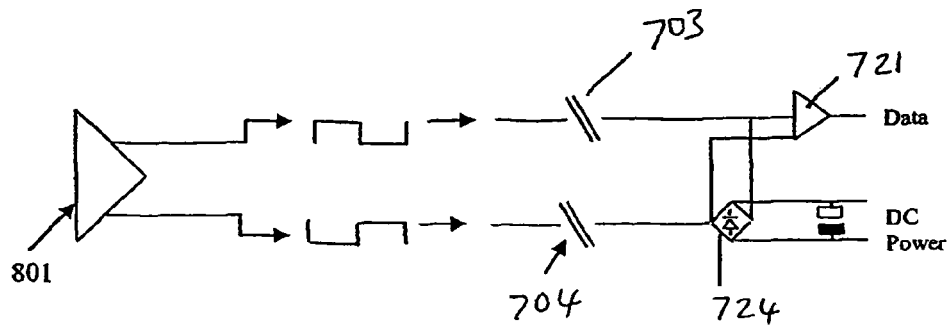
FIG. 12 illustrates how data and power can be transferred across the wireless coupling of apparatus embodying the invention.

The power deriver 724 may comprise a diode, diode array or bridge rectifier. For example, the power deriver 724 may comprise respective diodes coupled between the display screen capacitive coupling element of the wireless coupler 703 and the power supply lines 732 and 733 of the display screen. FIG. 12 illustrates one way in which the power deriver 724 may function. In FIG. 12, 801 represents the source of the AC signal to be capacitively coupled to the display screen via the capacitive couplers 703 and 704 and from which power is to be derived across the coupling field. This signal may be provided by the signal generator 712 in FIG. 11. In FIG. 12 the power deriver 724 comprises a bridge rectifier which generates a DC power supply from the signal capacitively coupled across the wireless coupling. The amount of power transferable is proportional to frequency and capacitance of the coupling field and, for a given capacitance, the higher the frequency of the signal the greater the conversion efficiency. Where higher frequencies cannot be achieved, power derived via the capacitive coupling may be stored at the display screen side, for example by the use of storage capacitors, so that the stored power can then be used as needed. This also has the advantage of allowing some control of power usage and allowing increase in power availability when power demand increases. Providing an ability to store power means that, for example, power could be transferred and stored when the system is 'at rest'. Thus, in the examples shown in FIG. 1 to 7, power could be transferred when the display screen of the video camera is in a closed configuration and the main camera is dormant. Alternatively power could be transferred when the camera is active but the user is not using the display screen.

In the example give above it is assumed that only one voltage level is applied giving capacity for only 1 or 0 signals. As an alternative multiple voltage levels could be applied to increase the signals possible and therefore provide increased data transfer and/or power capability.

In this example, a clock signal for the screen controller 720 is derived by a clock recoverer 723 from a clock signal supplied separately by a clock generator 711 of the main body 700 via the wireless coupler 703. The clock generator 711 may be an independent clock generator or may be arranged to derive a clock signal from a crystal clock of the main body controller 708. As another possibility, the clock recoverer 723 may derive a clock signal from a signal capacitively coupled to the clock recoverer 723 as described in WO02/052419, for example from the signal supplied by the signal generator 712, or from a separate carrier signal provided via the wireless coupler 703. As another possibility, the screen controller 720 may have a separate clock signal supplier in the form of its own crystal clock in which case the clock recoverer 723 will be omitted.

The display screen may need to communicate data to the main body. If so, the display screen functional components will include a screen data transmitter 722 that, under the control of the screen controller 720, causes data to be supplied to the main body via the capacitive coupling. The screen data transmitter 722 may communicate data by modulating a signal (for example the signal from the signal generator or a carrier signal) that is capacitively coupled to the display screen via the wireless coupler, as for example described in WO02/052419, WO00/31676 or WO02/093881. Usually, for simplicity, the screen data transmitter 722 will use the same modulation and data coding schemes as the main body transmitter, although this is not necessary as long as the main body data receiver 710 and demodulator 710 and main body controller 708 use the appropriate demodulation and decoding schemes.

As described above, the main body data controller 708 is a separate circuit within the camera main body. It may however be fully or partially provided by the main camera processor of the camera circuitry 705, in which case the interface 707 that ensures compatibility between received and/or transmitted signals and the main camera processor may not be required.

As described with reference to FIG. 11, the display screen derives a power supply from a signal supplied by the main body via the capacitive coupling. As another possibility, the display screen may be self-powered, in which case the power deriver will be a battery and the connection to the capacitive coupling element of the wireless coupler will be omitted. Alternatively both battery and separate power derivation means for deriving power via the capacitive coupling may be provided within the display screen.

In the case of a video camera, the data that may need to be supplied from the camera main body to the display screen assembly includes lens details, image details, light detection details and so on while the data that may need to be supplied from the display screen to the camera main body assembly includes user commands input via the screen, for example. It may be, however, that data only needs to be transferred in one direction. For example the sub-system may have limited intelligence and may supply no operating parameters to the main system.

The rate of data transfer required may be for example 10 to 40 Mbps (Mega bits per second 0 or 200 to 600 Mbps per pair of capacitive plates or for example as specified by the video electronics standards association (e.g. VESA MDDI specification).

The wireless capacitive couplers 703 and 704 of the apparatus illustrated by FIG. 11 may have any of the forms described above that are suitable for use with the particular type of mechanical coupling 702 used between the main body and the display screen. As shown in FIG. 11, two capacitive couplers are provided to ensure provision of a flow and return path across the mechanical coupling. As mentioned above, multiple wireless couplers may be associated with one mechanical coupling, for example incorporated into a single hinge assembly. These different wireless couplers may be used to transfer the same data or may be used for different purposes. Where they are used for different purposes it is possible to have different degrees of capacitive coupling for different couplers and therefore to achieve different rates of data transfer or power transfer. As another possibility, different methods of data transmission can be used for transmission of data across different couplings.

The capacitive couplers shown in FIGS. 1 to 7 and 8 provide a constant capacitive coupling regardless of the degree of rotation which has the advantage that the capacitive coupling is always the same regardless of any change in the configuration of the apparatus, that is regardless of the degree of rotation of the display screen relative to the main body of the camera In contrast the degree of overlap between the capacitive coupling elements and thus the degree of capacitive coupling in FIGS. 9 and 10 varies with the degree of movement or rotation.

In the case of the examples shown by FIGS. 1 to 7, different geometries may be adopted (for example to enable a better fit to the hinge assembly) where the degree of coupling varies with the rotation of the display screen provided that sufficient capacitive coupling is achieved over the range of rotation of the display screen. As another possibility, the capacitive coupling elements in FIGS. 1 to 7 may in any case be modified so that the degree of coupling varies with rotation of the screen. This could be achieved by, for example, forming the capacitive coupling elements by providing metallization only around part of the surface of non-conducting circular elements (FIGS. 1 and 2) or cylindrical non-conducting elements (FIGS. 4 to 6).

Advantage may be taken of such variation in capacitive coupling with rotation or movement to enable the degree of rotation or movement to be determined. Thus one of the main body and screen controllers 708 and 720 may be configured to determine the coupling capacitance and to compare it against a reference capacitance to determine the degree of rotation (or movement in the case of FIG. 10) of the display screen or cover relative to the main body. This may enable determination as to when the cover in FIG. 10 is open or closed and when the display screen in FIGS. 1 to 7 is in a fully rotated or a closed condition. Such information regarding the relative orientations or positions of the two components or sub-assemblies may be used by one or other of the controllers 708 and 720 in determining what data may be transmitted so that, for example, certain data may be transmitted only when the display is fully exposed (fully rotated in FIGS. 1 to 7 or the cover is fully opened in FIG. 11) or certain data transmitted only when the display is not rotated or the cover is closed, or to determine when power can be transferred, for example when the display is fully covered, for example.

As described above, the wireless coupling is capacitive. The capacitive coupling may be replaced by an inductive coupling.

Figure 13:
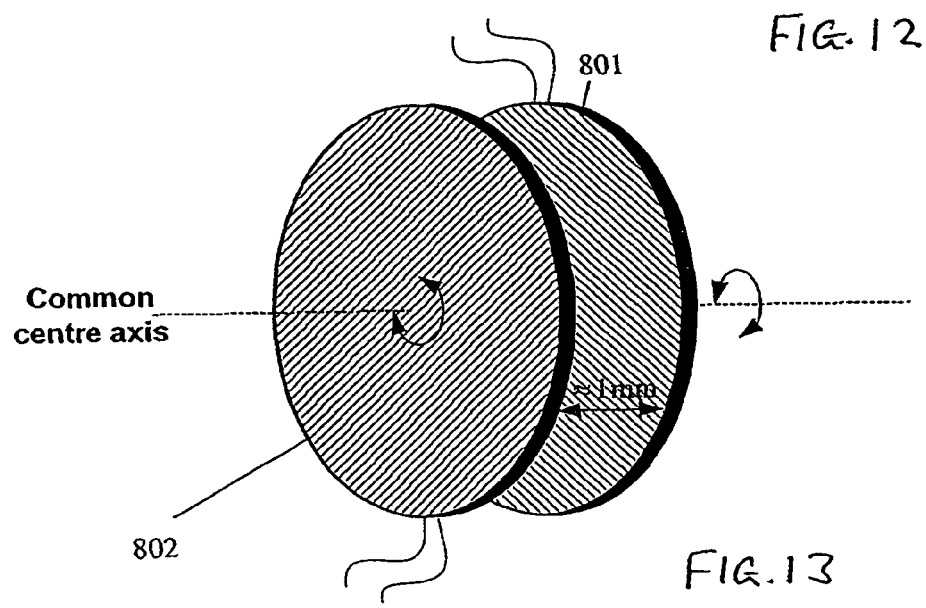
FIG. 13 shows a diagrammatic perspective view of an inductive wireless coupling that may used in place of the capacitive wireless coupling shown in FIGS. 1 to 3.

FIG. 13 illustrates an inductive coupler that may be used in place of the capacitive coupler shown in FIGS. 1 to 3. In this case, the inductive coupler consists of two inductive coupling elements in the form of coaxial planar, coils 801 and 802. The efficiency of this inductive coupler is governed primarily by the distance between the two coil planes, which should be as small as possible, typically about 1 mm (millimeter).

Figure 14:
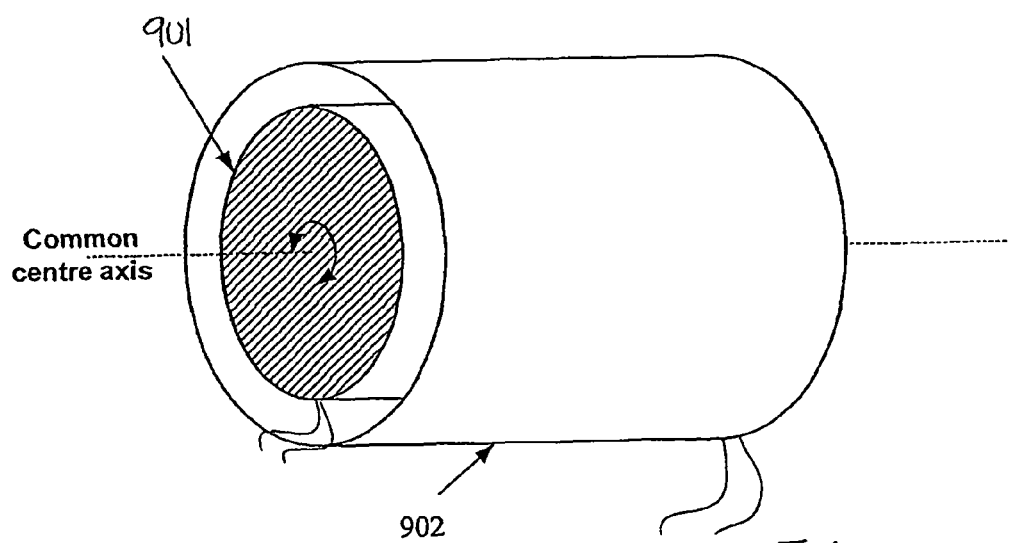
FIG. 14 shows a diagrammatic perspective view of an inductive wireless coupling that may used in place of the capacitive wireless coupling shown in FIGS. 4 to 6.

FIG. 14 illustrates an inductive coupler that may be used in place of the capacitive coupler shown in FIGS. 4 to 7. In this case, the inductive coupling elements are in the form of two coaxial cylindrical coils (solenoid coils) 901 and 902.

The functional components of apparatus that uses inductive rather than capacitive couplers will be similar to those shown in FIG. 11, except that, generally, coil drivers will be used to control the inductive coupling.

It should be apparent to the skilled man that the invention has application within a variety of different forms of mechanic couplings, including mechanical hinges different from those shown in FIGS. 1 to 7 and including other forms of mechanical coupling that allow rotation about two or more axis and/or mechanical couplings that allow both rotation and displacement. The mechanical coupling may be a direct mechanical coupling or may be via an intermediary body.

The present invention can be applied to any apparatus in which components or sub-assemblies are coupled by a mechanical coupling so that the configuration of the apparatus can be varied by effecting relative rotation and/or displacement or movement between the coupled components and in which at least one of data or power is to be transferred between the components. Examples of such apparatus, in addition to the video cameras mentioned above, are: laptop computers and personal data assistants (PDAs), video display units, screen based GPS systems and electronic test equipment, other screen based systems or units or other apparatus with similar assemblies or mechanisms. The present invention has particular application to portable devices, that is devices such as PDAs that can easily be carried by a human being, but can also be applied to larger devices that may be transportable or may be fixed in place.

The present invention may also be applied where components are coupled in series by respective mechanical couplings and at least one of data or power is to be transferred across at least one of the mechanical couplings. In addition the invention may also be of use in apparatus in which two sub-systems or components are relatively displaceable or rotatable to achieve mechanical coupling, but in which, relative movement is not possible after the components are coupled.

It will be appreciated that in each of the above embodiments the degree of coupling (whether capacitive or inductive) can be tailored to meet the requirements of the particular apparatus by adjusting any of the factors that control the degree of coupling. Thus, the degree of coupling can be tailored to meet requirements dependent upon, for example, any one or more of the type of data being transferred, the amount of data being transferred, the rate of data transfer, the requirement for power transfer and the number of couplers included within or associated with a given mechanical coupling. The ability to vary physical constraints within the mechanical coupling creates increased flexibility within the mechanical coupling or sub-assembly.

The capacitive or inductive coupling elements need not have the geometries mentioned above but may have any geometry that is compatible with the particular mechanical coupling of the apparatus.

Although separate capacitive and inductive coupling arrangements have been described above, it will be appreciated that it may be possible to use both in the same apparatus.

As described above, a return coupler is required. Where at least part of the apparatus is designed to be handheld or otherwise contacted by a user or other grounded object, it may be possible to provide a capacitive coupling in which the user or other object provides a ground return path in a manner similar to that described in WO00/31676, so removing the need for a return coupler.

It will be appreciated that the use of capacitive couplers is probably to be preferred where coupling is required over a short range and cross-talk may be an issue and that the use of inductive couplers is to be preferred for longer range communication were cross-talk is not an issue.

An embodiment provides a variable configuration apparatus having components or sub-systems, wherein at least some components have mechanical coupling elements that enable the configuration of the apparatus to be varied by changing at least one of the relative orientation and position of those components or sub-systems. These mechanical coupling elements incorporate wireless signal coupling elements that cooperate to provide a wireless coupling which enables wireless coupling between the components. The wireless coupling may be used to transfer at least one of data and power between the components. The wireless signal coupling elements may be capacitive coupling elements that provide capacitive coupling between the components or sub-systems. In an example, the apparatus is a video camera and one component or sub-system is a display screen and another component or sub-system is the main body of the video camera.

Apparatus embodying the invention allows, by virtue of the wireless coupling, a greater level of stress isolation to exist between the relatively movable components or sub-systems, which should reduce stress based failures.

Apparatus embodying the invention allows increased flexibility so that different components or sub-systems can be utilised without any requirement to replace the mechanical or galvanic connectors typical in such systems. For example, where the apparatus comprises a video camera and the mechanically coupled components comprise the camera main body and a display screen, the screen may be replaced with a different screen or different functional unit and the same wireless data and power transfer used between the main body of the camera system and the new screen or functional unit. There is no need to replace any ribbon cable or multiple wire technology. The capacitive or inductive coupling elements need merely be brought within operating range. This provides for interchangeability of parts. Such interchangeability may have additional advantages in the context of power transfer. For example re-charging could be provided through the mechanical coupling. Thus, a battery could be replaced within one component and power transferred to another mechanically coupled component, so removing the need for a separate charging station.

The invention claimed is:

1. An apparatus comprising first and second components having respective first and second mechanical coupling elements that cooperate to allow relative movement of the first and second components, the first mechanical coupling element comprising a recess formed therein and the second mechanical coupling element comprising a projection adapted to be movably fitted in the recess,
    wherein the first mechanical coupling element comprises a first conductive plate positioned in the recess and the second mechanical coupling element comprises a second conductive plate positioned on the projection, the first conductive plate having a first continuous surface extending diametrically across the first conductive plate, the second conductive plate having a second continuous surface extending diametrically across the second conductive plate, the first conductive plate positioned in the recess and the second conductive plate positioned on the projection so that the first continuous surface is positioned substantially parallel to the second continuous surface when the projection is fitted in the recess,
    further wherein the second conductive plate is configured to wirelessly couple a signal from one of the first and second components to the other of the first and second components.

2. An apparatus according to claim 1, wherein at least one of the first and second components has a data provider to communicate data to the other of the first and second components via the wireless coupling provided by the first and second couplers.

3. An apparatus according to claim 1, wherein at least one of the first and second components has a signal supplier coupled to one of the first conductive plate or the second conductive plate to supply a signal to be coupled to the other of the first and second components via the wireless coupling and at least one of the first and second components is arranged to communicate data to the other by modulating that signal.

4. An apparatus according to claim 1, wherein at least one of the first and second components has a power deriver operable to derive a power supply for that component from a signal coupled to that component from the other component via the wireless coupling.

5. An apparatus according to claim 4, wherein the power deriver comprises a rectifier.

6. An apparatus according to claim 4, wherein the power deriver comprises a rectifier and a charge storer.

7. An apparatus according to claim 1, wherein the first conductive plate and the second conductive plate provide at least one of a capacitive and an inductive wireless coupling.

8. An apparatus according to claim 1, wherein the degree of coupling between the first conductive plate and the second conductive plate varies with the relative positions or orientations of the first and second components and a determiner is provided to determine the degree of coupling to determine information relating to the relative positions and/or orientations of the first and second components.

9. An apparatus according to claim 1, wherein the first and second mechanical coupling elements define at least one of a rotatable and a slidable coupling.

10. An apparatus according to claim 1, wherein the first and second mechanical coupling elements provide coaxial parts of a hinge.

11. An apparatus according to claim 1, wherein the first and second mechanical coupling elements define a ball and socket arrangement.

12. An apparatus according to claim 1, wherein the first and second mechanical coupling elements provide a sliding mechanical coupling allowing relative sliding between the first and second components.

13. A apparatus according to claim 1, wherein the relative positions and/orientations of the first and second components are fixed once the mechanical coupling is made.

14. An apparatus according to claim 1, wherein the first and second components are sub-systems or sub-assemblies.

15. An apparatus according to claim 1, wherein the second component is a display device.

16. An apparatus according to claim 1, in the form of a laptop, PDA, video display unit, video camera, or a GPS system.

17. A method of wirelessly coupling a signal in an apparatus having first and second components having respective first and second mechanical coupling elements that cooperate to allow relative movement of the first and second components, the first mechanical coupling element comprising a recess formed therein and the second mechanical coupling element comprising a projection adapted to be movably fitted in the recess, the first mechanical coupling element comprising a first conductive plate positioned in the recess and the second mechanical coupling element comprising a second conductive plate positioned on the projection, the first conductive plate having a first continuous surface extending diametrically across the first conductive plate, the second conductive plate having a second continuous surface extending diametrically across the second conductive plate, the first conductive plate positioned in the recess and the second conductive plate positioned on the projection so that the first continuous surface is positioned substantially parallel to the second continuous surface when the projection is fitted in the recess, the method comprising wirelessly coupling the signal from the first component to the second component via the first conductive plate and the second conductive plate comprised in the first and second components.

18. An apparatus comprising first and second components having respective first and second mechanical coupling elements that cooperate to allow relative movement of the first and second components, the first mechanical coupling element comprising a recess formed therein and the second mechanical coupling element comprising a projection adapted to be movably fitted in the recess, wherein the first mechanical coupling element comprises signal coupling means having a first conductive device positioned in the recess and the second mechanical coupling element comprises signal coupling means having a second conductive device positioned on the projection, wherein the first conductive device comprises a first conductive plate having a first continuous surface extending diametrically across the first conductive plate, the second conductive device comprises a second conductive plate having a second continuous surface extending diametrically across the second conductive plate, the first conductive plate positioned in the recess and the second conductive plate positioned on the projection so that the first continuous surface is positioned substantially parallel to the second continuous surface when the projection is fitted in the recess, and further wherein the signal coupling means is configured to wirelessly couple a signal from one of the first and second components to the other of the first and second components.

* * * * *